United States Patent [19]
Bennett

[11] Patent Number: 5,384,526
[45] Date of Patent: Jan. 24, 1995

[54] PI OR PID CONTROL LOOP WITH SELF-LIMITING INTEGRATOR

[75] Inventor: George J. Bennett, Murrieta, Calif.

[73] Assignee: WangDAT, Inc., Irvine, Calif.

[21] Appl. No.: 90,846

[22] Filed: Jul. 13, 1993

[51] Int. Cl.[6] .............................................. G05B 11/42
[52] U.S. Cl. ..................... 318/610; 318/609; 318/611; 388/906; 388/903
[58] Field of Search ..................... 318/610, 609, 611; 388/906, 903

[56] References Cited

U.S. PATENT DOCUMENTS

| | | | |
|---|---|---|---|
| 4,319,173 | 3/1982 | Rhodes | 318/610 |
| 4,872,104 | 10/1989 | Holsinger | 318/610 |
| 4,893,068 | 1/1990 | Evans, Jr. | 318/610 |
| 5,134,354 | 7/1992 | Yamamoto et al. | 318/610 |
| 5,223,778 | 6/1993 | Svarovsky et al. | 318/610 |
| 5,231,341 | 7/1993 | Sang-Gwon | 318/610 |
| 5,265,188 | 11/1993 | Andoh | 318/610 |

Primary Examiner—William M. Shoop, Jr.
Assistant Examiner—Karen Masih
Attorney, Agent, or Firm—Robbins, Berliner and Carson

[57] ABSTRACT

A control system having proportional and integral functions for controlling the rotational speed of a motor. The system includes a self-limiting integrator for avoiding or limiting integral wrapup, a problem commonly associated with integral control. The self-limiting integrator includes an integrator, limit comparator, OR gate, delay circuit, and sign reversal circuitry. The integrator reverses direction of integration when an error limit is realized. The error limit, a preestablished and adjustable value, can be used to determine the rise and settle time of the speed of the motor independently of the gain.

37 Claims, 4 Drawing Sheets

PI OR PID CONTROL LOOP WITH SELF-LIMITING INTEGRATOR

BACKGROUND OF THE INVENTION

1. Field of the Present Invention

The present invention relates to the field of motion control and in particular to control loops including proportional and integral control factors which are used to control the rotational speed of motors such as the capstan drive motors used in magnetic tape drives.

2. Description of the Prior Art

Feedback or control loops are used to control many industrial processes, such as the rotational speed of motors. Simple control loops include a set point or desired value input, a measurement input which indicates the actual value of the parameter to be controlled, and a comparator to develop an error signal related to the difference between the desired and actual values. A control loop output signal, related to the error signal, is then applied to the control device whose parameter is to be controlled, such as a motor whose speed is to be controlled by the loop.

The control accuracy and response characteristics of control loops are conventionally enhanced by adding various control terms or weightings to the error signal in order to develop the control output signal. One classic enhanced servo control loop is known as the PID loop which includes proportional, integral and derivative terms added to the error signal to develop the desired control signal. PID loops are often applied where the accurate maintenance of a controlled parameter is important, such as the control of the rotational speed of the capstan in a magnetic tape drive.

The conventional proportional control term is a linear gain factor related to the difference between the magnitude of the error signal and the magnitude of the control signal necessary to achieve the desired result. The conventional integral term is a long time constant linear gain term, related to the integral of error signal, used to reduce the residual error that would otherwise occur in a proportional only control loop between the setpoint and measured values. Although integral terms are used to slowly bring the parameter to be controlled to exactly equal the desired setpoint value, integral terms tend to degrade system response to short term transients. Conventional derivative terms, related to the derivative of the error signal, are added to enhance system response to such short term transients without reducing the long term accuracy benefits of the integral terms.

Conventional control loops may be implemented in either hardware or software. For example, in a conventional hardware implementation, the PID terms are provided by separate amplifier, integrator and differentiator circuits. Alternately, these terms may be applied in a software implementation by an appropriate algorithm in a computer used to generate a value for the control signal in response to applied values for the measurement and setpoint inputs.

One common problem with conventional control loops, known as integral wrap-up, results from the inherent non-linearities of such control loops exaggerated by the non-linearities of the components of the loop when they are operated outside of their linear range. In a conventional capstan speed control loop, the amplifier used to apply the control voltage to the capstan drive motor is very non-linear in that the amplifier can drive the motor speed up very quickly but it cannot reduce motor speed as quickly because it must rely on system losses to reduce the speed. Wrap up is an exaggerated integral error which is built up during transient conditions, such as start-up or when the motor is temporarily jammed or stalled by an external problem. After startup is accomplished, or the stalled or jammed condition is resolved, the resultant built up error in the integral term hampers accurate control rather than enhancing it.

One known technique for reducing the harmful effects of integral wrap up is the feedforward technique in which closed loop servo control is sacrificed at start up for a predicted open loop control dependent upon the expected system response. Another known technique for reducing integral wrap up is to limit the integral value to a known, safe limit. That is, when a predetermined safe limit of integral error is reached, such conventional systems restrict further growth of the integral error term to a safe value which will not interfere with normal system operation, but will reduce the drastic overshoots which would otherwise occur after the transient condition has been removed.

For example, in a magnetic tape drive capstan speed control loop, if the tape is temporarily jammed by a piece of grit, the integral error builds up during the jam and causes an undesirable control response when the grit is dislodged. By limiting the integral build up to a predetermined safe limit, the undesirable control response can be limited.

Such known techniques for correcting or limiting integral wrap up require the relative complex determination of load dependent variables and are therefore not completely satisfactory. What is needed is a technique for limiting the harmful effects of integral wrapup without sacrificing closed loop control accuracy and response characteristics or requiring complex load dependent variable determinations.

As will become apparent in the "Detailed Description of the Invention" section below, the present invention overcomes many of the above disadvantages of the prior art in solving the problem of wrap up in PID loops.

SUMMARY OF THE INVENTION

The preceding and other shortcomings of prior art systems are addressed and overcome by the present invention. For example, in a magnetic tape drive, it is desired to keep tape speed as close as possible to a predetermined value (the setpoint). A tachometer is used to measure the tape speed, and the difference between the desired and actual speed (the error) is calculated. The error is magnified and drives a proportional amplifier whose output is applied back to a motor, forcing the motor speed closer to the desired value.

Since a loop with this simple proportional arrangement will never produce zero speed error, the error is also applied to an integrator which adds up the error over time. The integrator output is also amplified and added to that of the proportional amplifier, then applied back to the motor. A slow tape speed, for instance, causes the integrator output to continually rise, forcing the motor speed higher until the speed error is driven to zero.

A limit detector checks the total output of the integral and proportional amplifier, or the tape speed error. If the speed error is outside of the desired limit value, instead of just limiting the value of the integrator or turning it off as in the prior art, the integrator is left on. The sign of the error input to the integrator is reversed through some means and a small delay or hysteresis is introduced. This causes three effects—first, the integrator acts to drive the motor speed back and forth across the error limit, allowing it to be gradually modified by the proportional amplifier's output, which causes a very predictable and stable cycling loop behavior that does not interfere with normal loop operation, yet still drives the speed error toward zero. Second, the value of the error which the integral stores over time becomes modified by this action, so that when the limit condition ceases, the integrator is much less likely to produce wrapup and produces much better settling behavior. Third, by modifying the limit values and delay values, very different and useful behaviors can be extracted from the control loop without modifying loop amplifier characteristics, making this type of loop simpler to apply and more flexible.

From this example, it can be seen that the present invention provides, in a first aspect, a control system comprising an integrator for integrating an error value to produce an integrated value, control loop means responsive to the integrated value for producing a control output value to control a parameter to be controlled, limit detection means for determining when one or more limit conditions in the control loop is reached, and means responsive to the limit detection means for reversing the direction of integration of the error value when a limit condition is reached.

In another aspect, the present invention provides a method for controlling a parameter to be controlled by monitoring the parameter to be controlled, generating an error signal related to a difference between the parameter and a predetermined value, integrating the error signal in a first direction to produce a control signal, integrating the error signal in a second direction in response to the occurrence of a predetermined and adjustable limit condition, and controlling the parameter in response to the control signal.

In still another aspect, the present invention provides a method for limiting integral wrapup in a control system by integrating an error value to produce an increasing control value for use in the control system, comparing a variable in the control system with a predetermined and adjustable limit value related thereto, and integrating the error value to produce a decreasing control value when the variable reaches the limit value related thereto.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF THE INVENTION

Figure 1:
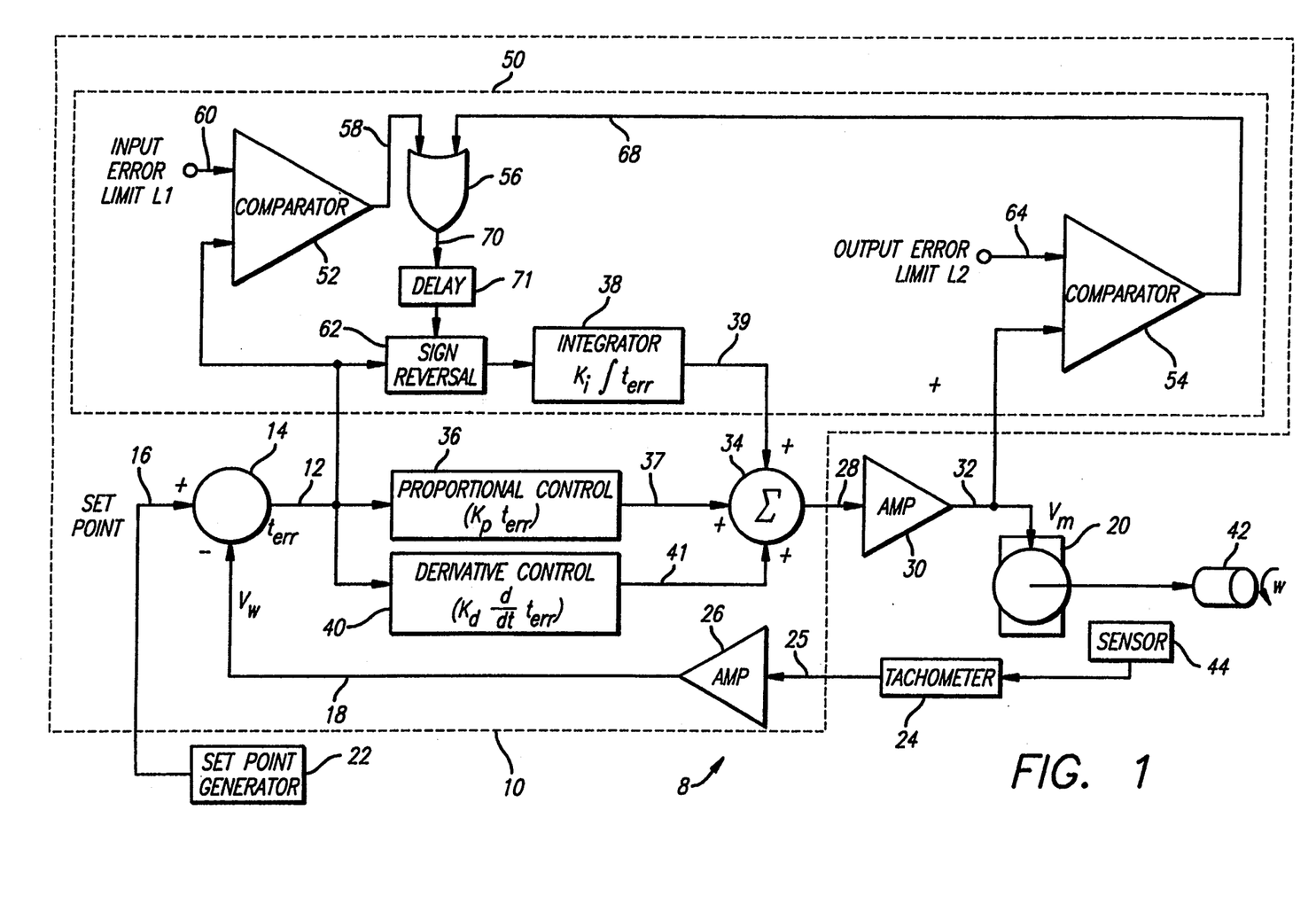
FIG. 1 is a schematic illustration of a motor speed control loop including a PID loop with self-limiting integrator in accordance with the present invention.

FIG. 1 is a diagram of a control loop 8 for controlling the rotational speed of capstan drive motor 20. For illustrative purposes, an analog PID loop 10 is shown, although the present invention could be used with other types of control loops which include proportional and integral control factors. Capstan drive motor 20 drives capstan 42 at a motor shaft speed w. Motor shaft speed w is measured by sensor 44, typically an optical shaft encoder. Other conventional optical, magnetic, or capacitive sensors may also be used. Tachometer 24, driven at motor shaft speed w, produces a tachometer output 25 related to motor shaft speed w. The output of tachometer 24 is applied to PID loop 10, described in detail below.

PID loop 10 includes proportional control amplifier 36, self-limiting integrator 50, derivative circuit 40, tachometer amplifier 26, error subtractor 14 and summer 34. PID loop 10 combines proportional control amplifier 36, self-limiting integrator 50, and derivative circuit 40 control terms to generate control signal 28. Control signal 28 is amplified by power amplifier 30, the output of which, motor voltage $V_m$ is applied over control line 32 to capstan drive motor 20 to adjust the motor shaft speed w so that it equals, or approximately equals, target speed $t_c$.

Parameters $K_p$, $K_i$ and $K_d$ denote the proportionality constants for the proportional, integral and derivative terms, respectively. In operation, tachometer output 25 is amplified by tachometer amplifier 26 to generate a monitored speed signal $V_w$, applied over control line 18, representing the motor shaft speed w. Monitored speed signal $V_w$ is applied to error subtractor 14, which compares monitored speed signal $V_w$ with target speed $t_c$ to generate error signal $t_{err}$. Error signal $t_{err}$ is applied over control line 12, to self-limiting integrator 50, proportional control amplifier 36 and derivative circuit 40. Target speed $t_c$, applied over control line 16, is generated by setpoint generator 22, typically a microprocessor.

Proportional control amplifier 36 generates a proportional control signal 37 having a value proportional to error signal $t_{err}$. Derivative circuit 40 generates a derivative output signal 41 having a value proportional to the derivative of error signal $t_{err}$. Self-limiting integrator 50, described in detail below, generates an integrator output signal 39 having a value proportional to the integral of error signal $t_{err}$. Integrator output signal 39 is added to the proportional control signal 37 and the derivative output signal 41 to cancel or offset residual errors, including the residual error produced by proportional control amplifier 36. Proportional control signal 37, integrator output signal 39 and derivative output signal 41 are combined by summer 34 to generate control signal 28. Control signal 28 is amplified by power amplifier 30, the output of which, motor voltage $V_m$, is applied to capstan drive motor 20. Motor voltage $V_m$ is used to adjust the motor shaft speed w of motor 20 so that it equals, or approximately equals, target speed $t_c$.

As shown in FIG. 1, self-limiting integrator 50 includes integrator 38, input and output error limit comparators 52 and 54, OR gate 56, delay circuit 71, and sign reversal circuit 62. Self-limiting integrator 50 generates an integrator output signal 39 which, when combined with proportional control signal 37 and derivative output signal 41 in summer 34, forms control signal 28. Integrator output signal 39 reduces errors which may prevent the motor shaft speed w from reaching the target speed $t_c$, such as the residual error produced by the proportional gain term. Integrator 38 in self-limiting integrator 50 computes the integral of error signal $t_{err}$ over time. In operation, integrator 38 repeatedly adds up all the values of error signal $t_{err}$ over time, stores the sum in a variable in RAM, and multiplies the sum by integral gain $K_i$. A positive error signal $t_{err}$ applied to integrator 38 will lead to an increasing integrator output signal 39; a negative error signal $t_{err}$ applied to integrator 38 will lead to a decreasing integrator output signal 39.

In accordance with the present invention, self-limiting integrator 50 provides for self-limiting to avoid or limit integral wrapup, a problem commonly associated with integral control. Wrapup occurs when integrator 38 builds up a large value, which results in excessive overshoots and related problems. Wrapup is typically caused by large error signal changes triggered by startup, mechanical interference or other large disturbances. For example, if the capstan 42 momentarily jams due to grit or particle contamination, a large error will build up on the integral output 39, resulting in drastic overshoot when the capstan 42 breaks free. This can cause severe problems, including loss of control. Thus, in conventional PID control loops, the actual speed of the motor settles to the target speed only after the actual speed goes through a series of overshoots and undershoots.

In accordance with a primary advantage of the present invention, the magnitude and duration of such fluctuations are reduced by self-limiting integrator 50, shown in FIG. 1. Integrator output signal 39 reverses direction when an adjustable error limit, such as input error limit $L_1$ or output error limit $L_2$, is realized. $L_1$ and $L_2$ are variable error limits measured at input error limit 60 and at output error limit 64, respectfully. When the error limit is realized, the polarity of error signal $t_{err}$ is reversed by sign reversal circuit 62, causing integrator 38 to integrate in the reverse direction.

Conventionally, PID loops cross the desired target speed at a time which is dependent on the gain of each of the proportional, integral and derivative functions. Settle time becomes inversely proportional to the loop gain, making tradeoffs difficult and highly interdependent. In accordance with a primary advantage of the present invention, since the error limit is adjustable, the error limit can be used to determine the rise time and settle time of the speed independently of the loop gain. The error limit could be actively controlled to vary the loop step response as necessary. In operation, the time required to reach the desired target speed is dependent only on the error limit, if gains are above a minimum value which will cause the error limit to be reached. This causes settle time to be much faster and smoother.

In accordance with another advantage of the present invention, the integral phase can be carefully coordinated with the known characteristics of the PID loop so that second order effects can be compensated for. By choosing different error limit values, the effects of many types of lagging loads can be canceled. The ability to choose the point at which the integral pulls out of its limit point, independent of loop gain, gives an added degree of freedom and allows much easier loop design and tuning to be achieved.

Furthermore, self-limiting integrator reduces the need for the derivative circuit 40 control term to be used. In practice, the derivative circuit 40 control term is often undesirable to use in PID loops because it amplifies noise. Since the derivative circuit control term is often used to limit transients, self-limiting integrator 50 reduces the need for the derivative function by clamping transient behavior in a controllable way and improving settle times without introducing noise into the system.

In operation, proportional control amplifier 36, self-limiting integrator 50 and derivative circuit 40 are engaged. Capstan drive motor 20 drives shaft 42 at a motor shaft speed w. Motor shaft speed w is measured by sensor 44. Tachometer 24, driven at motor shaft speed w, produces a tachometer output 25 related to motor shaft speed w. Tachometer output 25 is amplified by tachometer amplifier 26 to generate a monitored speed signal $V_w$ representing the motor shaft speed w. Monitored speed signal $V_w$ is applied to error subtractor 14, which compares monitored speed signal $V_w$ with target speed $t_c$ to generate error signal $t_{err}$.

Within self-limiting integrator 50, error signal $t_{err}$ is applied to input error limit comparator 52 and sign reversal circuit 62. Input error limit comparator 52 generates an input error trigger 58 when error signal $t_{err}$ equals, or approximately equals, input error limit $L_1$. Input error trigger 58 is applied to OR gate 56, which is triggered in response to input error trigger 58 or output error trigger 68. Output error trigger 68 is generated by output error limit comparator 54, which generates output error trigger 68 when motor voltage $V_m$ equals, or approximately equals, output error limit $L_2$.

Once triggered, OR gate 56 generates a reversal signal 70 which is applied to delay circuit 71. Delay circuit 71 introduces a time lag between input and output error limit comparators 52 and 54, and sign reversal circuit 62. When input error limit $L_1$ is utilized, error signal $t_{err}$ is compared with input error limit $L_1$ at specific intervals related to the time lag added by delay circuit 71. Similarly, when output error limit $L_2$ is utilized, motor voltage $V_m$ is compared with output error limit $L_2$ at specific intervals related to the time lag added by delay circuit 71. In accordance with the present invention, delay circuit 71 can be adjusted to achieve a desired sampling interval. When the sampling interval is decreased, less time is allowed between each determination of the input or output error limit $L_1$ or $L_2$. Consequently, the ripple on motor voltage $V_m$ typically decreases.

When the error limit in operation is not realized, normal integral operation occurs and integrator output signal 39 slowly drifts towards an optimum offset value. OR gate 56 is not triggered and the sign of error signal $t_{err}$ is not reversed. Once triggered, however, OR gate 56 applies reversal signal 70 to delay circuit 71, which introduces a time lag into self-limiting integrator 50. The output of delay circuit 71 is applied to sign reversal circuit 62, which reverses the polarity of error signal $t_{err}$ applied to integrator 38, causing integrator 38 to integrate in the opposite direction. Integrator 38 continuously integrates in the opposite direction until the error limit in operation is realized again. When the error limit is realized, integrator 38 starts integrating in the opposite direction, thus backing out of the limit condition. As motor shaft speed w approaches the target speed $t_c$, integrator output signal 39 drifts towards the optimal offset value, no longer affected by the error limit.

Thus, in accordance with the present invention, integrator 38 reverses direction of integration at a value established by input error limit $L_1$ or output error limit $L_2$. During normal operation, when integrator 38 is not affected by error limit $L_1$ or $L_2$, self-limiting integrator 50 would integrate in the same direction the entire time. Integral signal 39 would first hit the error limit in operation, such as input error limit $L_1$ or output error limit $L_2$, then alternately back out and re-enter the limit area as the data changes. As motor shaft speed w rises towards target speed $t_c$, integral signal 39 backs down proportionately lower until the limit threshold is realized.

More specifically, operation of self-limiting integrator 50 will be described using output error limit $L_2$. Operation of self-limiting integrator 50 using input error limit $L_1$ proceeds similarly. At startup, when the difference between the motor shaft speed w and the target speed $t_c$ is large, output error limit $L_2$ is realized. The sign of the error signal $t_{err}$ at integrator 38 is reversed, driving the output of integrator 38, integrator output signal 39, opposite of its normal direction. This causes the motor voltage $V_m$ to be lowered until the motor voltage $V_m$ crosses over output error limit $L_2$, at which point the sign of the error signal $t_{err}$ at integrator 38 is reversed once again, restoring error signal $t_{err}$ to its normal polarity. This cyclic crossing of the output error limit $L_2$ causes the output to remain at output error limit $L_2$ regardless of the error signal $t_{err}$.

As the motor shaft speed w rises, proportional control signal 37 begins to drop. This drop is compensated for by the rise in integrator output signal 39, in order to keep motor voltage $V_m$ at the output error limit $L_2$. When the motor shaft speed w reaches the target speed $t_c$, the proportional error signal 37 starts to go negative, pulling the integrator 38 out of its limit cycle and leaving the desired offset value, $L_2-t_c$, at integrator output signal 39.

Assuming gains are above a minimum value which will cause output error limit $L_2$ to be reached, the time required for the motor shaft speed w to cross the desired target speed $t_c$ is primarily dependent on the output error limit $L_2$. As a result, the settle time is much faster and smoother.

Error limits could be established at points other than the locations shown for input error limit $L_1$ and output error limit $L_2$, shown in FIG. 1. Additionally, error limits, such as $L_1$ and $L_2$, could be established for conditions other than integral wrapup. For example, the integral could be frozen at a limit near zero to minimize the residual error associated with proportional control during startup. If, on the other hand, motion is already near the desired speed but mechanical interference is suddenly encountered, the integral could be limited to whatever value is required to produce a reasonable force to unjam capstan. As speed is gradually recovered by the proportional portion of the algorithm, the integral limit gradually reduces itself until the output reaches normal values.

Furthermore, in accordance with another embodiment of the invention, instead of using delay circuit 71 to introduce a time lag into self-limiting integrator 50, hysteresis is introduced into the input of comparator 52 or 54. Comparator 52 or 54 looks at both the voltage and slope of the signal being compared. For example, assuming implementation of output error limit $L_2$, output error limit comparator 54 looks at both the voltage and the slope of motor voltage $V_m$. When motor voltage $V_m$ is increasing, output error limit $L_2$ is set to a higher value. Conversely, when motor voltage $V_m$ is decreasing, output error limit $L_2$ is set to a lower value.

Figure 2:
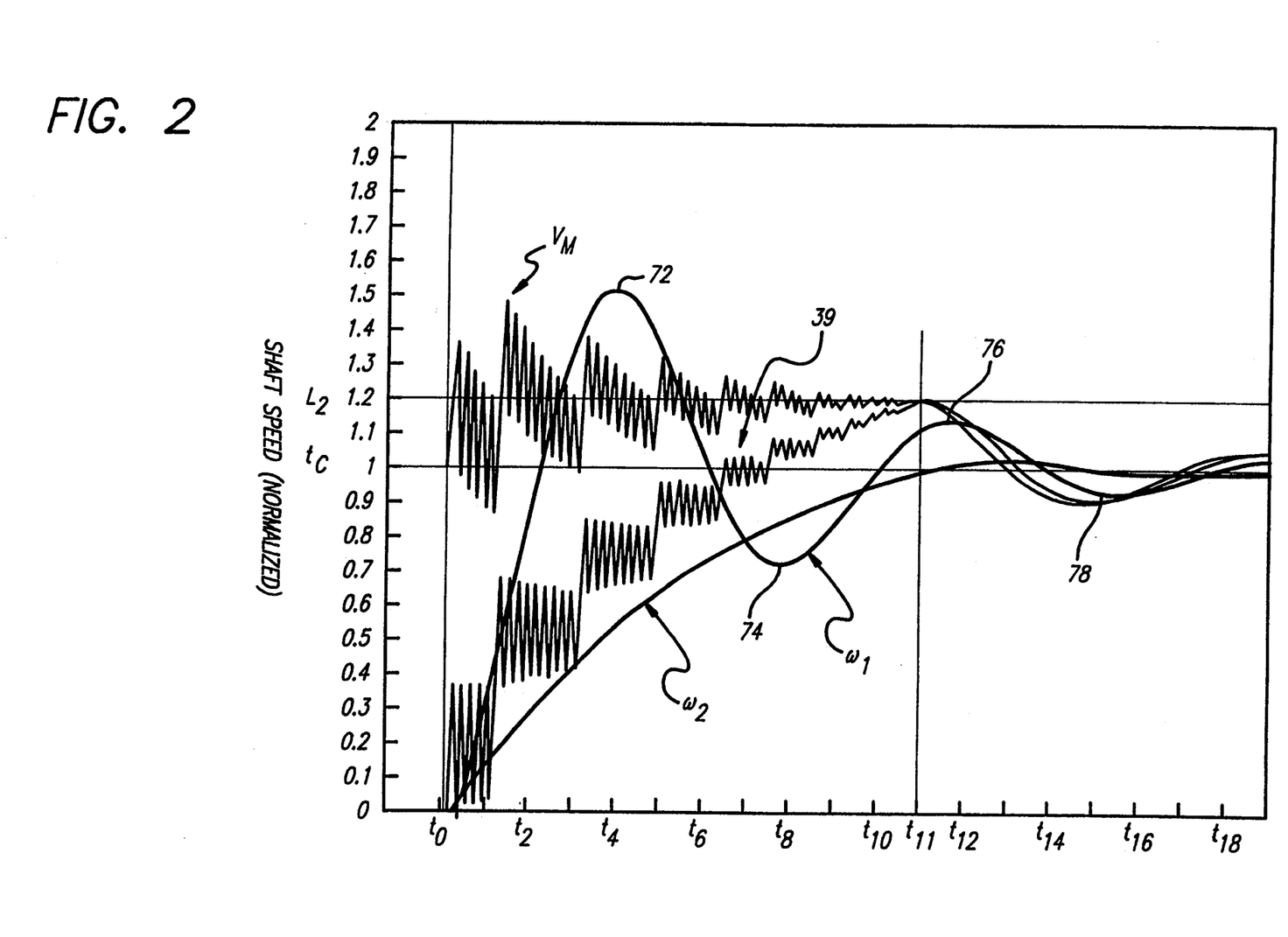
FIG. 2 is a set of speed versus time curves showing motor shaft speed controlled by a conventional PID loop and motor shaft speed controlled by the PID loop with self-limiting integrator shown in FIG. 1.

FIG. 2 is a set of speed versus time curves showing motor shaft speed $w_1$ controlled by a conventional PID loop and motor shaft speed $w_2$ controlled by PID loop 8 with self-limiting integrator 50, shown in FIG. 1. The following discussion refers to FIGS. 1 and 2.

For convenience, at an initial time $t_0$, both conventional PID loop and PID loop 8 with self-limiting integrator 50, and motor 20 are at rest. Motor shaft speeds $w_1$ and $w_2$ may be considered at some initialized state, such as zero. At startup, proportional, integral and derivative control functions are engaged. Motor shaft speed $w_1$, controlled by a conventional PID loop, settles to a target speed $t_c$ only after the motor shaft speed $w_1$ goes through a series of dwindling overshoots 72, 76 and undershoots 74, 78. In accordance with a primary advantage of the present invention, the magnitude and duration of such fluctuations are reduced by self-limiting integrator 50. For illustrative purposes, operation of self-limiting integrator 50 will be described using output error limit $L_2$. Operation of self-limiting integrator 50 using input error limit $L_1$ proceeds similarly. For illustrative purposes, output error limit $L_2$, which is adjustable, is set to 1.2 in FIG. 2. Output error limit comparator 54 compares motor voltage $V_m$ to output error limit $L_2$ at a sampling interval determined by delay circuit 71. Motor voltage $V_m$ is sampled every 0.01 seconds in FIG. 2. In accordance with the present invention, delay circuit 71 can be adjusted to achieve a desired sampling rate. When the sample rate is increased, the motor voltage $V_m$ ripple generally decreases.

Referring to FIG. 2, at time $t_{0.01}$, motor voltage $V_m$ is sampled and found to be greater than output error limit $L_2$. At this time, the polarity of error signal $t_{err}$ delay circuit 71. Motor voltage $V_m$ is sampled every 0.01 is reversed, causing integrator 38 to integrate in the negative direction. Typically, integrator output signal 39 initially decreases because motor voltage $V_m$ is higher than output error limit $L_2$ when sampled. As a result, output error limit comparator 54 usually starts out active, causing integrator 38 to integrate in the negative direction. Since motor voltage $V_m$ is the sum of proportional output 37, integrator output 39, and derivative output 41, motor voltage $V_m$ is typically less than output error limit $L_2$ during the next sampling.

At time $t_{0.02}$, motor voltage $V_m$ is sampled and found to be less than output error limit $L_2$. Consequently, the polarity of error signal $t_{err}$ is reversed, causing integrator 38 to integrate in the positive direction.

At time $t_{0.03}$, motor voltage $V_m$ is sampled again and found to be greater than output error limit $L_2$. As in the earlier case, the polarity of error signal $t_{err}$ is reversed, causing integrator 38 to integrate in the negative direction.

When motor voltage $V_m$ is sampled again at time $t_{0.04}$, it is found to be less than output error limit $L_2$. Consequently, the sign of integrator output signal 39 is reversed and motor voltage $V_m$ begins to climb again because of the rising integrator output signal 39.

As a result of the sampling, a sawtooth waveform of motor voltage $V_m$ is generated. Self-limiting integrator 50 periodically readjusts itself to keep motor voltage $V_m$ centered at the output error limit $L_2$. Thus, as the motor voltage $V_m$ rises, self-limiting integrator 50 adjusts its integrator output signal 39 to compensate for the other terms of the PID loop 10. If the proportionality constant $K_p$ for the proportional control amplifier 36 were to be twice as high, then integrator output signal 39 would oscillate at a lower value in order to keep motor voltage $V_m$ close to output error limit $L_2$.

As motor shaft speed $w_2$ rises towards target speed $t_c$, error signal $t_{err}$ diminishes towards zero. This causes motor voltage $V_m$ and output signal 39 to have gradually diminishing sawtooth ripple waveforms. At time $t_{11}$, when motor shaft speed $w_2$ crosses target speed $t_c$, self-limiting integrator 50 begins to drive motor voltage $V_m$ negative, pulling it away from the output error limit $L_2$ and ending the sawtooth waveforms. The polarity of error signal $t_{err}$ is reversed by sign reversal circuit 56, causing integrator 38 to integrate in the conventional direction. However, between the time output error limit $L_2$ is crossed and the sign of error signal $t_{err}$ is reversed, the time lag introduced by delay circuit 71 typically occurs. This causes integrator output signal 39 to overshoot a very small amount. At time $t_{11}$, when integrator 38 is returned to the conventional direction of integration, unaffected by the error limit, self-limiting integrator 50 catches up to the rising proportional control term 37 as well as the change introduced by the overshoot caused by the small time lag.

Thus, when output error limit $L_2$ is crossed, output error limit comparator 54 activates sign reversal circuit 62, causing integrator 38 to integrate in the opposite direction. This alternating action is very rapid compared to motor shaft speed $w_2$ changes. The degree of overshoot caused by the time lag depends on the sample rate and the error amplitude, which interact to produce the sawtooth waveform. In practice, the sawtooth waveforms are not distinct, since system noise causes sufficient jitter to cover over the steps. Generally, when the sample rate is increased, the sawtooth ripple waveform decreases.

Figure 3:
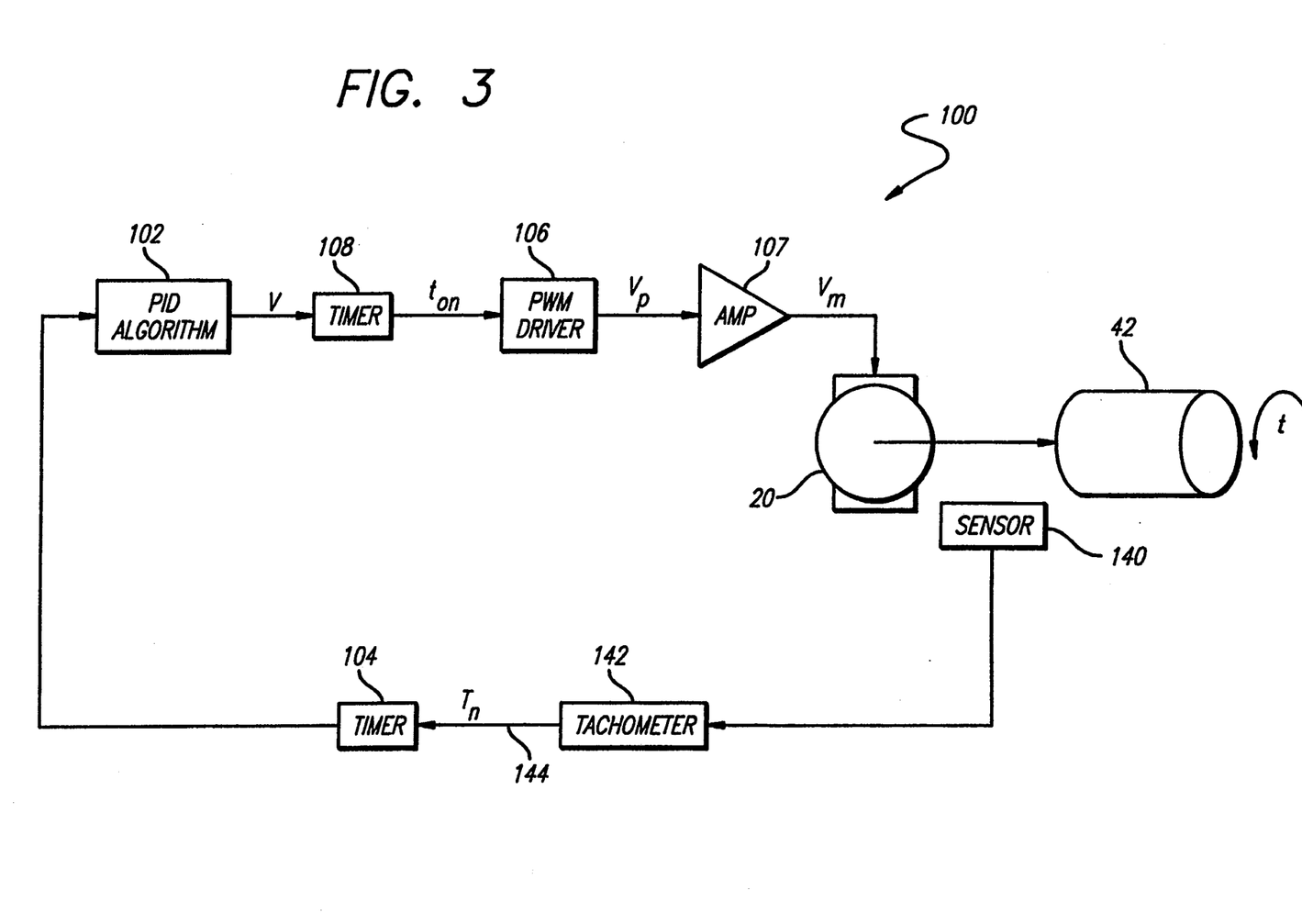
FIG. 3 is a schematic illustration of a motor speed control loop including a digital PID algorithm in accordance with another embodiment of the invention.

FIG. 3 is a diagram of a motor speed control loop 100 including digital PID algorithm 102 for controlling the rotational speed of capstan drive motor 20 in accordance with another embodiment of the invention. As in the case of the PID system 8 shown in FIG. 1, a common objective of the digital PID algorithm 102 is to minimize the error, even in the presence of disturbances.

In operation, digital PID algorithm 102, implemented in microprocessor 22, generates an output voltage V which is applied to output timer 108. Output timer 108 produces a pulse train $t_{on}$ whose duty cycle is proportional to the desired motor voltage. Pulse train $t_{on}$ is applied to pulse width modulation ("PWM") driver 106, which produces a proportional voltage signal $V_p$ having an average output voltage directly proportional to the duty cycle of the input waveform $t_{on}$. Proportional voltage $V_p$ is amplified by power amplifier 107, the output of which, motor voltage $V_m$, is applied to motor 20. Motor voltage $V_m$ is used to adjust the motor shaft speed w so that it equals, or approximately equals, a desired target speed. The desired target speed is typically set by microprocessor 22, or an equivalent device.

Motor 20 drives a load, such as capstan 42, at a motor shaft speed w. Motor shaft speed w is measured by sensor 140, typically an optical shaft encoder. Other conventional optical, magnetic, or capacitive sensors may also be used. Tachometer 142, driven at motor shaft speed w, produces a motor pulse train 144, having a motor pulse period $T_n$. Pulse train $T_n$ is applied to input timer 104, which measures the pulse width $T_n$ and inverts it to produce a number proportional to velocity. Microprocessor 22 monitors the output of input timer 104 and implements digital PID algorithm 102 in response thereto. PID algorithm 102, described in detail below, reads the input timer 104 every sampling period, performs its calculations, and outputs its value via the output timer 108.

Figure 4:
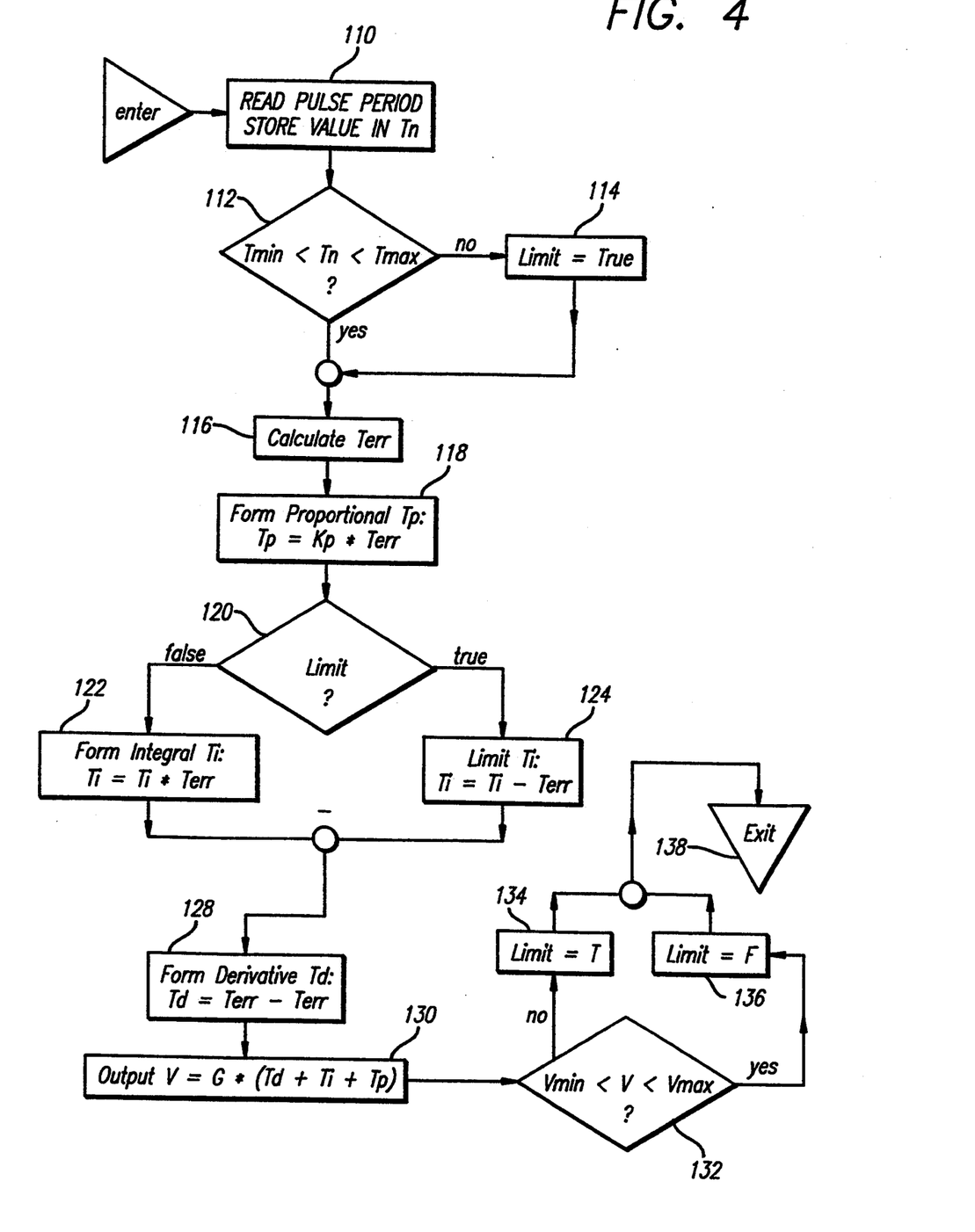
FIG. 4 is a flowchart of the digital PID algorithm shown in FIG. 3.

FIG. 4 is a flowchart of PID algorithm 102 shown in FIG. 3. PID algorithm 102 is implemented on a digital microcomputer which uses an input timer 104 to sample the pulse period $T_n$ of motor 20 and a output timer 108 to produce a pulse train $t_{on}$ whose duty cycle is proportional to the desired motor voltage. PID algorithm 102 is executed at a pre-specified sample rate, which determines the loop characteristics as in a conventional loop. The addition of a single check for a limit logical variable allows the backout algorithm to be implemented. Tests for typical limits are performed both before and after algorithm execution. A conventional loop would require several limit value checks to be performed within the integral calculation in order to match the correct limit condition with the desired limit value for the integral.

As shown in FIG. 4, the procedure begins with reading and storing the pulse period $T_n$ (step 110). As shown in FIG. 3, capstan drive motor 20 drives capstan 42 at a motor shaft speed w. Motor shaft speed w is measured by sensor 140, typically an optical shaft encoder. Tachometer 142, driven at motor shaft speed w, produces a pulse train 144 having a pulse period $T_n$.

In step 112, a limit check is performed on pulse period $T_n$, determined in step 110. If $T_n$ does not fall between $T_{min}$ and $T_{max}$, limit value is set to true (step 114). Pulse period $T_n$ is then compared with a desired setpoint to generate error signal $T_{err}$ (step 116).

In step 118, the proportional control signal is generated in accordance with the equation, $$T_p = K_p * T_{err} \quad (1)$$

where $K_p$ denotes the proportionality constant for the proportional term. Integral offset signal is formed in step 120. The polarity of error signal $T_{err}$ is reversed when the limit value equals true. At that point, integral control is generated in accordance with the equation, $$T_i = T_i - T_{err} \quad (2)$$

Conversely, when the limit value equals false, integral control is generated in accordance with the equation, $$T_i = T_i + T_{err} \quad (3)$$

In step 118, derivative control is generated in accordance with the equation, $$T_d = (T_{errn} - T_{errn-1})/dt \quad (4)$$

Derivative control signal, integral offset signal $T_i$ and proportional control signal $T_p$ are combined and amplified by gain G to generate output voltage V (step 130). Output voltage is generated in accordance with the equation, $$V = G * (T_d + T_i + T_p). \quad (5)$$

Output voltage V is limit checked in step 132. When $V_{min} < V < V_{max}$, the limit condition is false (step 136), and the output value is applied to motor. Conversely, when the limit condition is true (step 134), the polarity of error signal $T_{err}$ is reversed for purposes of determining integration offset $T_i$. Output voltage V is applied to the capstan drive motor to adjust the actual rotational speed t of the motor so that it equals, or approximately equals, target speed $t_c$.

While this invention has been described with reference to its presently preferred embodiment(s), its scope is only limited insofar as defined by the following set of claims and all equivalents thereof.

What is claimed is:

1. A control system, comprising:
    an integrator for producing a representation of a sum of an error value over time;
    control loop means responsive to the representation of the sum of the error value over time for producing a control output value to modify the error value;
    limit detection means for determining when one or more error limit values in the control loop is realized; and
    means responsive to the limit detection means for reversing the sign of the error value input to the integrator when one or more error limit values is realized.

2. The invention of claim 1, wherein the error limit value is adjustable and the limit detection means further comprises:
    a system variable; and
    comparator means for comparing the system variable with the error limit value.

3. The invention of claim 2, wherein the means responsive to the limit detection means for reversing the sign of the error value further comprises:
    an OR gate responsive to the comparator means for producing a sign reversal signal; and
    sign reversal means responsive to the OR gate for changing the sign of the error value applied to the integrator in response to a determination that the error limit value is realized.

4. The invention of claim 3, wherein the comparator means for comparing the system variable with the error limit value further comprises:
    sampling means for sampling the system variable at a specific interval.

5. The invention of claim 4, wherein the sampling means is adjustable.

6. The invention of claim 5, wherein the sampling means for sampling the system variable at a specific interval further comprises:
    means for introducing delay time between the OR gate and the sign reversal means.

7. The invention of claim 5, wherein the sampling means for sampling the system variable at a specific interval further comprises:
    means for introducing hysteresis into the comparator means.

8. The invention of claim 5, wherein the error limit value further comprises an input limit value;
    the system variable further comprises an input value; and
    the limit detection means further comprises an input limit detection means for comparing the input value to the input limit value.

9. The invention of claim 8, wherein the input value is the error value.

10. The invention of claim 5, wherein the error limit value further comprises an output limit value;
    the system variable further comprises an output value; and
    the limit detection means further comprises an output limit detection means for comparing the output value to the output limit value.

11. The invention of claim 5, wherein the control loop means further comprises:
    proportional and integral control factors.

12. The invention of claim 11, wherein the parameter to be controlled is speed.

13. The invention of claim 12, further comprising:
    means for adjusting the error limit value to control the rise time of the speed independently of the control loop gain.

14. The invention of claim 13, further comprising:
    means for actively controlling the error limit value to vary response of the control loop as necessary.

15. The invention of claim 14, further comprising:
    means for adjusting the error limit value to compensate for second order effects.

16. The invention of claim 15, wherein the error limit value is chosen to compensate for the effect of lagging loads.

17. A method for controlling a parameter to be controlled, comprising the steps of:
    monitoring the parameter to be controlled;
    generating an error signal related to a difference between the parameter and a predetermined value;
    integrating said error signal in a first direction to produce a control signal;
    reversing the sign of the error signal prior to integration when one or more error limit values is realized; and
    controlling the parameter in response to the control signal.

18. The method claimed in claim 17, further comprising the step of:
    adjusting the error limit value to vary the response of the control signal.

19. The method claimed in claim 18, wherein the step of reversing the sign of the error signal prior to integration when one or more error limit values is realized further comprises the steps of:
    sampling a system variable at a specific interval;
    comparing the system variable with the error limit value;
    generating error trigger signals when the system variable exceeds the error limit value; and
    reversing direction of integration of the error signals in response to the error trigger signals.

20. The method claimed in claim 19, wherein the step of sampling a system variable at a specific interval further comprises the step of:
    introducing delay time prior to reversing the sign of the error signal.

21. The method claimed in claim 19, wherein the step of sampling a system variable at a specific interval further comprises the step of:
    introducing hysteresis prior to reversing the sign of the error signal.

22. The method claimed in claim 19, wherein the error limit value further comprises an input error limit value.

23. The method claimed in claim 22, wherein the step of sampling a system variable at a specific interval further comprises the step of:

sampling the input error limit value prior to integration.

24. The method claimed in claim 23, wherein the step of sampling an input error limit value further comprises the step of:

sampling the error signals prior to integration.

25. The method claimed in claim 22, wherein the error limit value further comprises an output error limit value and the step of sampling a system variable at a specific interval further comprises the step of:

sampling the output error limit value subsequent to integration.

26. The method claimed in claim 25, wherein said step of monitoring the parameter to be controlled further comprises the step of:

monitoring a speed to be controlled.

27. The method claimed in claim 26, further comprising the step of:

adjusting the error limit value to control the rise time of the speed independently of the control loop gain.

28. The method claimed in claim 27, further comprising the step of:

actively controlling the error limit value to vary the response of the control loop as necessary.

29. The method claimed in claim 28, further comprising the step of:

adjusting the error limit value to compensate for second order effects.

30. The method claimed in claim 29, wherein the second order effects includes the effect of lagging loads.

31. A method for limiting integral wrapup in a control system, comprising the steps of:

integrating an error value to produce an increasing control value for use in the control system;

comparing a variable in the control system with an adjustable error limit value related thereto; and integrating the error value to produce a decreasing control value when the variable reaches the error limit value related thereto.

32. The invention of claim 31, further comprising the subsequent step of:

integrating the error value to produce an increasing control value when the variable reaches the error limit value related thereto.

33. The invention of claim 32, wherein the variable is the error value.

34. The invention of claim 33, wherein the variable is the control value.

35. The invention of claim 34, further comprising the following step preliminary to integration:

applying the error value to a sign reversal component to change the sign of the error signal being integrated when the variable reaches the error limit value related thereto.

36. The invention of claim 35, further comprising the step of:

adjusting the error limit value to vary the response of the control value.

37. The invention of claim 36, further comprising the step of:

actively controlling the error limit value to vary the response of the control system as necessary.

* * * * *